(12) United States Patent
Degenstein et al.

(10) Patent No.: US 10,086,829 B2
(45) Date of Patent: Oct. 2, 2018

(54) METHOD AND CONTROL DEVICE FOR CONTROLLING A POWER STEERING DEVICE AND AN ADAPTIVE DAMPING SYSTEM OF A MOTOR VEHICLE

(71) Applicant: GM GLOBAL TECHNOLOGY OPERATIONS LLC, Detroit, MI (US)

(72) Inventors: Thomas Degenstein, Ruesselsheim (DE); Marcus-Andre Reul, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 103 days.

(21) Appl. No.: 15/234,146

(22) Filed: Aug. 11, 2016

(65) Prior Publication Data

US 2017/0043764 A1 Feb. 16, 2017

(30) Foreign Application Priority Data

Aug. 12, 2015 (DE) .................. 10 2015 010 566

(51) Int. Cl.
*B62D 5/04* (2006.01)
*B60W 30/02* (2012.01)
(Continued)

(52) U.S. Cl.
CPC .......... *B60W 30/02* (2013.01); *B60G 17/0162* (2013.01); *B60G 17/0195* (2013.01); *B60W 10/20* (2013.01); *B60W 10/22* (2013.01); *B62D 6/002* (2013.01); *B62D 6/04* (2013.01); *B60G 2200/44* (2013.01); *B60G 2400/41* (2013.01);
(Continued)

(58) Field of Classification Search
CPC ...... B60W 30/02; B60W 10/22; B60W 10/20; B60W 2510/20; B60W 2510/225; B60G 17/0162; B60G 17/0195; B60G 2500/10; B62D 6/002; B62D 6/04
See application file for complete search history.

(56) References Cited

U.S. PATENT DOCUMENTS

| 4,555,126 A | 11/1985 | Ishimitsu et al. |
| 6,354,396 B1 | 3/2002 | Horton et al. |
| 2005/0234620 A1 | 10/2005 | Roll et al. |

(Continued)

FOREIGN PATENT DOCUMENTS

| DE | 3817540 A1 | 11/1989 |
| DE | 102005038390 A1 | 6/2006 |

(Continued)

OTHER PUBLICATIONS

Machine Translation of JP-3950217-B2, printed Jan. 7, 2017 (Year: 2007).*

(Continued)

*Primary Examiner* — Alan D Hutchinson
(74) *Attorney, Agent, or Firm* — Lorenz & Kopf, LLP

(57) ABSTRACT

A method is provided to control a power steering device and an adaptive damping system of a motor vehicle. The power steering device makes available a mechanical steering angle range that is limited by steering stops. The adaptive damping system makes available a variable damping force. The damping force of the adaptive damping system is increased and a maximum achievable steering angle is simultaneously increased in case a steering stop is reached.

15 Claims, 2 Drawing Sheets

(51) Int. Cl.
*B60W 10/20* (2006.01)
*B60W 10/22* (2006.01)
*B62D 6/00* (2006.01)
*B62D 6/04* (2006.01)
*B60G 17/0195* (2006.01)
*B60G 17/016* (2006.01)

(52) U.S. Cl.
CPC ..... *B60G 2500/10* (2013.01); *B60W 2510/20* (2013.01); *B60W 2510/225* (2013.01); *B60W 2710/207* (2013.01)

(56) References Cited

U.S. PATENT DOCUMENTS

| | | | |
|---|---|---|---|
| 2006/0287790 | A1 | 12/2006 | Seifert et al. |
| 2011/0172872 | A1 | 7/2011 | Takahashi et al. |
| 2011/0295465 | A1* | 12/2011 | Harder ................ B62D 5/0469 701/42 |
| 2013/0124043 | A1 | 5/2013 | Degenstein |
| 2016/0221601 | A1* | 8/2016 | Barthomeuf ......... B62D 5/0469 |
| 2017/0210192 | A1* | 7/2017 | Reybrouck ........ B60G 17/0165 |

FOREIGN PATENT DOCUMENTS

| | | |
|---|---|---|
| DE | 102008052991 A1 | 4/2009 |
| DE | 102011116456 A1 | 4/2013 |
| DE | 102012022900 A1 | 5/2014 |
| JP | 3950217 B2 * | 7/2007 |
| WO | 2014195625 A2 | 12/2014 |

OTHER PUBLICATIONS

German Patent Office, German Search Report for German Application No. 1020150105663, dated May 18, 2016.

Intellectual Property Office, Search Report for United Kingdom Patent Application No. GB1610238.6 dated Nov. 28, 2016.

* cited by examiner

METHOD AND CONTROL DEVICE FOR CONTROLLING A POWER STEERING DEVICE AND AN ADAPTIVE DAMPING SYSTEM OF A MOTOR VEHICLE

CROSS-REFERENCE TO RELATED APPLICATION

This application claims priority to German Patent Application No. DE102015010566.3, filed Aug. 12, 2015, which is incorporated herein by reference in its entirety.

TECHNICAL FIELD

The present disclosure pertains to a method and a control device for controlling a power steering device and an adaptive damping system of a motor vehicle. The power steering device makes available a mechanical steering angle range that is limited by steering stops and the adaptive damping system makes available a variable damping force.

BACKGROUND

A variety of driver assistance systems are increasingly installed in motor vehicles in order to assist a driver of the motor vehicle in different situations during the operation of the motor vehicle and to thereby reduce the stress of the driver during the operation of the motor vehicle.

DE 10 2011 116 456 A1 discloses a device for varying the maximum steering angle of at least one steerable motor vehicle wheel. The device features a servo component, by which the maximum steering angle of the motor vehicle wheel can be varied, and an electronic control device that controls the servo component. In this case, a sensor is provided for determining at least one piece of wheel-specific information affecting the maximum steering angle of the motor vehicle wheel and coupled to the servo component and/or the control device. Furthermore, a sensor is also provided for determining the instantaneous steering angle of the motor vehicle wheel or for determining at least one parameter correlative with the instantaneous steering angle of the motor vehicle wheel.

SUMMARY

In accordance with the present disclosure, a method and a control device are provided for controlling a power steeling device and an adaptive damping system of a motor vehicle, by which the control of a maximum achievable steering angle can be improved. In particular, a method is provided for controlling a power steering device and an adaptive damping system of a motor vehicle, in which the power steering device makes available a mechanical steering angle range that is limited by steering stops and the adaptive damping system makes available a variable damping force and in which the damping force of the adaptive damping system is increased and a maximum achievable steering angle is increased, particularly increased simultaneously, in case a steering stop is reached.

In order to improve the driving characteristics and to increase the traffic safety, motor vehicles are equipped with selective or adaptive damping systems, in which the damping properties of the damping system are varied, for example, in an amplitude-dependent fashion. Consequently, the damping characteristics can also be adapted, for example, to different uneven driving surfaces in dependence on an instantaneous vehicle speed. The system generates amplitude-dependent damping forces, such that the damping is dependent on the spring travel of the suspension strut.

The damping systems are usually designed for adjusting the damping forces as low as possible when the vehicle is driven over uneven driving surfaces in order to ensure optimal damping. In this case, the adjustment of a damping force exerted upon the motor vehicle by the damping system also affects the potential wheel travel of a motor vehicle wheel, i.e. a potential change of a clearance between a wheel suspension of the at least one steerable motor vehicle wheel and the vehicle structure of the motor vehicle. For example, the amount of a potential change of a clearance between a wheel suspension of the at least one steerable motor vehicle wheel and the vehicle structure can generally be reduced by increasing the damping forces such that the probability and therefore also the risk of the motor vehicle wheel approaching other vehicle components can be lowered, particularly while driving over roadway boundaries that are elevated with respect to a roadway surface. This is advantageous in combination with a power steering device, which makes available a mechanical steering angle range that is limited by steering stops, for example while slowly maneuvering the motor vehicle in constricted areas, because additional steering rack travel can be released and a turning radius of the motor vehicle therefore can also be optimized in case a driver of the motor vehicle drives over a roadway boundary that is elevated with respect to a roadway surface, for example, while the tires are fully turned. This in turn makes it possible to minimize a required active back-steering maneuver by the power steeling device, which could be perceived as irritating by the driver of the motor vehicle, or to at least carry out this back-steering maneuver slower. This results in a risk minimization and a comfort gain for the driver of the motor vehicle. Since the method is based on the interaction between a power steering device and an adaptive damping system and therefore on components and systems that are known from and installed in conventional motor vehicles, this can furthermore be realized without requiring elaborate and costly modifications.

In this case, the increase of the damping force may include increasing the damping force in such a way that a hard damping force characteristic results. In conventional adaptive damping systems, the damping forces can be electrically varied discretely or continuously within a hydraulic adaptation range of the damping system. The damping force characteristic particularly can be varied between at least two adjustments, namely hard or very high damping forces and soft or low damping forces. Since the damping forces counteract a change of a clearance between the wheel suspension of the at least one steerable motor vehicle wheel and the vehicle structure, changes of a clearance between the wheel suspension of the at least one steerable motor vehicle wheel and the vehicle structure can be virtually prevented with very high damping forces or a hard damping force characteristic, i.e. a wheel travel change can be minimized as a function of the time and the risk of the motor vehicle wheel approaching other vehicle components can be additionally lowered, particularly while driving over roadway boundaries that are elevated with respect to a roadway surface, wherein additional steering rack travel can furthermore be released due to the interaction with the power steering device in order to thereby optimize the turning radius of the motor vehicle.

In addition, the damping force and the maximum achievable steering angle can be reduced again as soon as the steering angle once again falls short of the steering stop. The damping force and the maximum achievable steeling angle particularly can be reset to the previous adjustments as soon as the steering angle once again falls short of the steering stop, for example due to a manual back-steering maneuver by the driver, and the regular control mode, which is optimally adapted to the motor vehicle and/or the driving situation, can be resumed as soon as an optimization of the turning radius is no longer required. In this way, the comfort for the driver of the motor vehicle can be additionally improved.

According to an embodiment, the method may furthermore include an active back-steering maneuver by the power steering device until the steering angle once again falls short of the steering stop. Since the risk of the motor vehicle wheel approaching other vehicle components can be reduced due to the increased damping forces, the active back-steering maneuver from the oversteering range can be carried out slower than in motor vehicles, in which a damping force of an active damping system is not increased simultaneously with an increase of the maximum achievable steering angle and it is therefore absolutely imperative to reduce a steering rack travel of the steering system in order to prevent a motor vehicle wheel from approaching the vehicle structure, wherein this back-steering maneuver consequently is no longer perceived as annoying or irritating by the driver of the motor vehicle such that the comfort for the driver of the motor vehicle can be additionally optimized.

In addition, the method may also include the determination of at least one piece of wheel-specific information affecting the maximum achievable steering angle and a variation of the maximum achievable steering angle based on the at least one piece of wheel-specific information affecting the maximum achievable steering angle. In this way, the maximum achievable steering angle can also be adapted based on the at least one piece of information affecting the maximum achievable steering angle such as, for example, the dimensions of the motor vehicle wheel, i.e. an additional variable control of the steeling rack travel is incorporated and results in an additionally improved risk minimization, as well as an additional comfort gain, for the driver of the motor vehicle. Since such variable controls of the steering rack travel are known from and commonly installed in conventional motor vehicles, their function can be utilized for the inventive method without requiring elaborate and costly modifications.

In this case, the at least one piece of wheel-specific information affecting the maximum achievable steering angle may include information on the width of a wheel of the motor vehicle and/or information on an attachment part on the wheel that changes the width of the wheel. In this way, the maximum achievable steering angle and therefore the steering system of the motor vehicle can be adapted to the dimensions of an installed tire such that the turning radius is optimized with respect to the dimensions of the tire, wherein it is also possible to take into account attachment parts that change the width of the wheel such as, for example, snow chains.

Another embodiment of the present disclosure discloses a computer program that, when executed on an arithmetic unit of the motor vehicle, instructs the arithmetic unit to carry out a method of the above-described type. In addition, the present disclosure discloses a machine-readable medium, on which such a computer program is stored.

Such a computer program has the advantage of making it possible to carry out a method for controlling a power steering device and an adaptive damping system of a motor vehicle, by which the control of a maximum achievable steering angle can be additionally optimized. Conventional motor vehicles are equipped with selective or adaptive damping systems in order to vary the damping properties of the damping system, for example, in an amplitude-dependent fashion and to thereby improve the driving characteristics and the traffic safety. In this way, the damping characteristics can also be adapted, for example, to different uneven driving surfaces in dependence on an instantaneous vehicle speed.

The system generates amplitude-dependent damping forces, which means that the damping is dependent on the spring travel of the suspension strut. The damping systems are usually designed for adjusting the damping forces as low as possible when the vehicle is driven over uneven driving surfaces in order to ensure optimal damping. In this case, the adjustment of a damping force exerted upon the motor vehicle by the damping system also affects the potential wheel travel of a motor vehicle wheel, i.e. a potential change of a clearance between a wheel suspension of the at least one steerable motor vehicle wheel and the vehicle structure of the motor vehicle. For example, the amount of a potential change of a clearance between a wheel suspension of the at least one steerable motor vehicle wheel and the vehicle structure can generally be reduced by increasing the damping forces such that the probability and therefore also the risk of the motor vehicle wheel approaching other vehicle components can be lowered, particularly while driving over roadway boundaries that are elevated with respect to a roadway surface. This is advantageous in combination with a power steeling device, which makes available a mechanical steering angle range that is limited by steering stops, for example while slowly maneuvering the motor vehicle in constricted areas, because additional steering rack travel can be released and a turning radius of the motor vehicle therefore can also be optimized in case a driver of the motor vehicle drives over a roadway boundary that is elevated with respect to a roadway surface, for example, while the tires are fully turned. This in turn makes it possible to minimize a required active back-steering maneuver by the power steering device, which could be perceived as irritating by the driver of the motor vehicle, or to at least carry out this back-steering maneuver slower. This results in a risk minimization and a comfort gain for the driver of the motor vehicle. Since the method is based on the interaction between a power steering device and an adaptive damping system and therefore on components and systems that are known from and installed in conventional motor vehicles, this can furthermore be realized without requiring elaborate and costly modifications.

Another embodiment of the present disclosure discloses a control device for controlling a power steering device and an adaptive damping system of a motor vehicle. The power steering device makes available a mechanical steering angle range that is limited by steering stops. The adaptive damping system makes available a variable damping force. The control device features a sensor configured to determine whether a steering stop is reached. A first control unit controls the damping system and is designed for increasing the damping force of the adaptive damping system in case a steering stop is reached. A second control unit controls the power steering device and is designed for increasing the maximum achievable steering angle in case the steering stop is reached.

Such a control device for controlling a power steering device and an adaptive damping system of a motor vehicle has the advantage of making it possible to additionally optimize the control of a maximum achievable steering angle. Conventional motor vehicles are equipped with selective or adaptive damping systems in order to vary the damping properties of the damping system in an amplitude-dependent fashion and to thereby improve the driving characteristics and the traffic safety. In this way, the damping characteristics can also be adapted, for example, to different uneven driving surfaces in dependence on an instantaneous vehicle speed. The system generates amplitude-dependent damping forces, which means that the damping is dependent on the spring travel of the suspension strut. The damping systems are usually designed for adjusting the damping forces as low as possible when the vehicle is driven over uneven driving surfaces in order to ensure optimal damping. In this case, the adjustment of a damping force exerted upon the motor vehicle by the damping system also affects the potential wheel travel of a motor vehicle wheel, i.e. a potential change of a clearance between a wheel suspension of the at least one steerable motor vehicle wheel and the vehicle structure of the motor vehicle.

For example, the amount of a potential change of a clearance between a wheel suspension of the at least one steerable motor vehicle wheel and the vehicle structure can generally be reduced by increasing the damping forces with the aid of the first control unit such that the probability and therefore also the risk of the motor vehicle wheel approaching other vehicle components can be lowered, particularly while driving over roadway boundaries that are elevated with respect to a roadway surface. This is advantageous in combination with a power steering device, which makes available a mechanical steering angle range that is limited by steering stops, for example while slowly maneuvering the motor vehicle in constricted areas, because additional steering rack travel can be released and a turning radius of the motor vehicle therefore can also be optimized in case a driver of the motor vehicle drives over a roadway boundary that is elevated with respect to a roadway surface, for example, while the tires are fully turned. This in turn makes it possible to minimize a required active back-steering maneuver by the power steering device, which could be perceived as irritating by the driver of the motor vehicle, or to at least carry out this back-steering maneuver slower. This results in a risk minimization and a comfort gain for the driver of the motor vehicle. Since the method is based on the interaction between a power steering device and an adaptive damping system and therefore on components and systems that are known from and installed in conventional motor vehicles, this can furthermore be realized without requiring elaborate and costly modifications.

In this case, the first control unit for controlling the damping system may be designed for increasing the damping force in such a way that a hard damping force characteristic results. In conventional adaptive damping systems, the damping forces can be electrically varied discretely or continuously within a hydraulic adaptation range of the damping system. The damping force characteristic particularly can be varied between at least two adjustments, namely hard or very high damping forces and soft or low damping forces. Since the damping forces counteract a change of a clearance between the wheel suspension of the at least one steerable motor vehicle wheel and the vehicle structure, changes of a clearance between the wheel suspension of the at least one steerable motor vehicle wheel and the vehicle structure can be virtually prevented with very high damping forces or a hard damping force characteristic, i.e. a wheel travel change can be minimized as a function of the time and the risk of the motor vehicle wheel approaching other vehicle components can be additionally lowered, particularly while driving over roadway boundaries that are elevated with respect to a roadway surface, wherein additional steering rack travel can furthermore be released due to the interaction with the power steering device in order to thereby optimize the turning radius of the motor vehicle.

In addition, the first control unit may be designed for reducing the damping force again as soon as the steering angle once again falls short of the steering stop and the second control unit may be designed for reducing the maximum achievable steering angle again as soon as the steering angle once again falls short of the steering stop. The first and the second control unit particularly may be designed in such a way that the damping force and the maximum achievable steering angle are reset to the previous adjustments as soon as the steering angle once again falls short of the steering stop, for example due to a manual back-steering maneuver by the driver, and the regular control mode, which is optimally adapted to the motor vehicle and/or the driving situation, can be resumed as soon as an optimization of the turning radius is no longer required. In this way, the comfort for the driver of the motor vehicle can be additionally improved.

According to an embodiment, the power steering device may be designed for actively back-steering until the steering angle once again falls short of the steering stop. Since the risk of the motor vehicle wheel approaching other vehicle components can be reduced due to the increased damping forces, the active back-steering maneuver from the oversteering range can be carried out slower than in motor vehicles, in which the damping force of an active damping system is not increased simultaneously with an increase of the maximum achievable steering angle and it is therefore absolutely imperative to reduce a steering rack travel of the steering system in order to prevent a motor vehicle wheel from approaching the vehicle structure, wherein this back-steering maneuver consequently is no longer perceived as annoying or irritating by the driver of the motor vehicle such that the comfort for the driver of the motor vehicle can be additionally optimized.

The control device may furthermore feature a second sensor configured to determine at least one piece of wheel-specific information affecting the maximum achievable steering angle and the second control unit may be designed for varying the maximum achievable steering angle based on the at least one piece of wheel-specific information affecting the maximum achievable steeling angle. In this way, the maximum achievable steering angle can also be adapted based on the at least one piece of wheel-specific information affecting the maximum achievable steering angle such as, for example, the dimensions of the motor vehicle wheel, i.e. an additional variable control of the steering rack travel is incorporated and results in an additionally improved risk minimization, as well as an additional comfort gain, for the driver of the motor vehicle. Since such variable controls of the steering rack travel are known from and commonly installed in conventional motor vehicles, they can be utilized for the inventive method without requiring elaborate and costly modifications.

In this case, the at least one piece of wheel-specific information affecting the maximum achievable steering angle may include information on the width of a wheel of the motor vehicle and/or information on an attachment part on the wheel that changes the width of the wheel. In this way, the maximum achievable steering angle and therefore the steering system of the motor vehicle can be adapted to the dimensions of an installed tire by the control device such that the turning radius is optimized with respect to the dimensions of the tire. It is also possible to take into account attachment parts that change the width of the wheel such as, for example, snow chains.

In addition, another embodiment of the present disclosure discloses a motor vehicle that features a control device of the above-described type. Such a motor vehicle has the advantage of featuring a control device for controlling a power steering device and an adaptive damping system of a motor vehicle, by which a maximum achievable steering angle can be additionally optimized. Conventional motor vehicles are equipped with selective or adaptive damping systems in order to vary the damping properties of the damping system in an amplitude-dependent fashion and to thereby improve the driving characteristics and the traffic safety. In this way, the damping characteristics can also be adapted, for example, to different uneven driving surfaces in dependence on an instantaneous vehicle speed. The system generates amplitude-dependent damping forces, such that the damping is dependent on the spring travel of the suspension strut. The damping systems are usually designed for adjusting the damping forces as low as possible when the vehicle is driven over uneven driving surfaces in order to ensure optimal damping. In this case, the adjustment of a damping force exerted upon the motor vehicle by the damping system also affects the potential wheel travel of a motor vehicle wheel, i.e. a potential change of a clearance between a wheel suspension of the at least one steerable motor vehicle wheel and the vehicle structure of the motor vehicle.

For example, the amount of a potential change of a clearance between a wheel suspension of the at least one steerable motor vehicle wheel and the vehicle structure can generally be reduced by increasing the damping forces such that the probability and therefore also the risk of the motor vehicle wheel approaching other vehicle components can be lowered, particularly while driving over roadway boundaries that are elevated with respect to a roadway surface. This is advantageous in combination with a power steering device, which makes available a mechanical steering angle range that is limited by steering stops, for example while slowly maneuvering the motor vehicle in constricted areas, because additional steering rack travel can be released and a turning radius of the motor vehicle therefore can also be optimized in case a driver of the motor vehicle drives over a roadway boundary that is elevated with respect to a roadway surface, for example, while the tires are fully turned. This in turn makes it possible to minimize a required active back-steering maneuver by the power steering device, which could be perceived as irritating by the driver of the motor vehicle, or to at least carry out this back-steering maneuver slower. This results in a risk minimization and a comfort gain for the driver of the motor vehicle.

In summary, the present disclosure provides a method and a control device for controlling a power steering device and an adaptive damping system of a motor vehicle, by which the control of a maximum achievable steering angle can be additionally optimized. Due to the interaction of a power steering device and an adaptive damping system, in which the power steering device makes available a mechanical steering angle range that is limited by steering stops and the adaptive damping system makes available a variable damping force and in which the damping force of the adaptive damping system is increased simultaneously with an increase of a maximum achievable steering angle in case a steering stop is reached, additional steering rack travel can be released and a turning radius of the motor vehicle therefore can also be optimized in case a driver of the motor vehicle drives over a roadway boundary that is elevated with respect to a roadway surface while slowly maneuvering the motor vehicle in constricted areas, for example, with the tires fully turned. In this way, a required active back-steering maneuver by the power steering device, which could be perceived as irritating by the driver of the motor vehicle, can be minimized or at least carried out slower.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
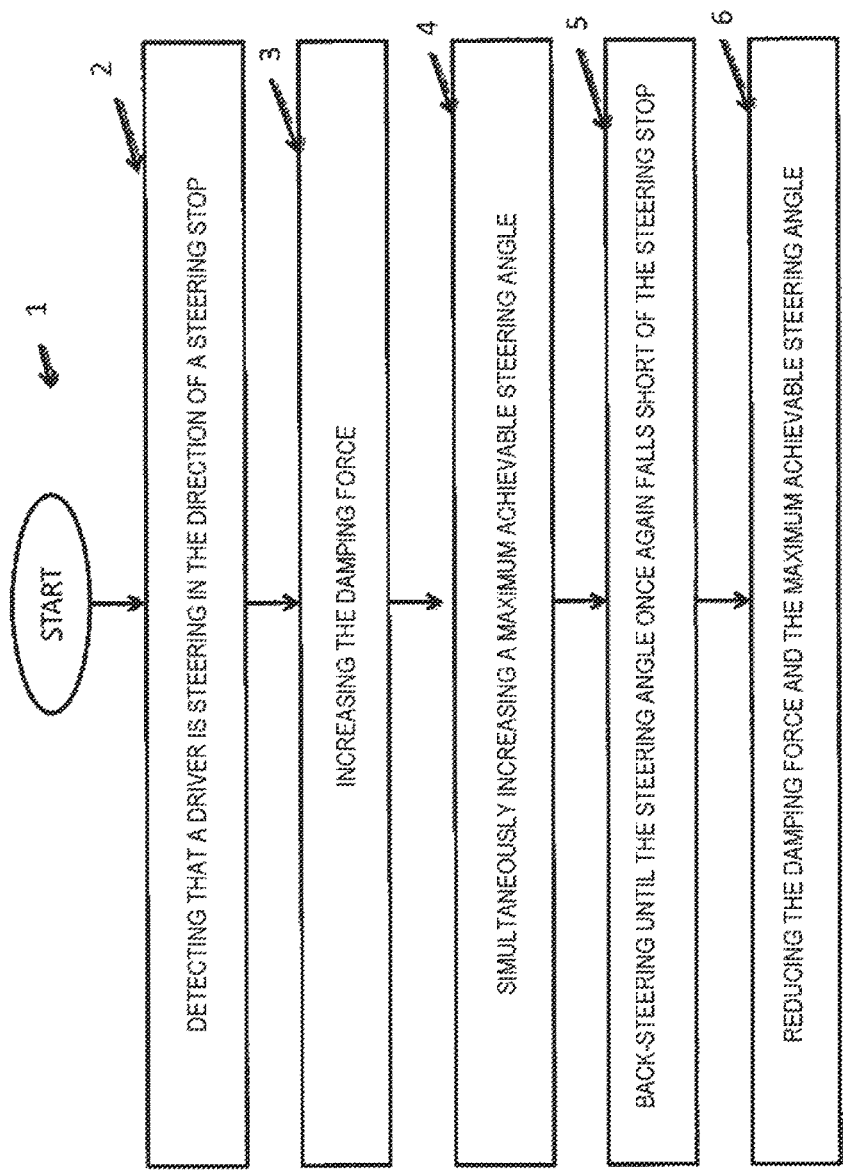
FIG. 1 shows a flowchart of a method for controlling a power steering device and an adaptive damping system of a motor vehicle in accordance with embodiments of the present disclosure.

FIG. 1 shows a flowchart of a method 1 for controlling a power steering device and an adaptive damping system of a motor vehicle according to embodiments of the present disclosure, wherein the power steering device makes available a mechanical steering angle range that is limited by steering stops and the adaptive damping system makes available a variable damping force.

According to FIG. 1, the method includes the following steps. In step 2, it is initially determined that a driver of the motor vehicle steers in the direction of a steering stop, whereupon the damping force of the adaptive damping system is increased in step 3 and a maximum achievable steering angle is increased in step 4. The damping force and the steering angle may be increased simultaneously, as well as with a certain time delay.

Since the adjustment of a damping force exerted upon the motor vehicle by the damping system also affects a potential wheel travel of a motor vehicle wheel or its envelope, i.e. a potential change of a clearance between the wheel suspension of the at least one steerable motor vehicle wheel and the vehicle structure of the motor vehicle or the wheel housing, the amount of a potential change of the clearance between a wheel suspension of the at least one steerable motor vehicle wheel and the vehicle structure can generally be reduced by increasing the damping forces such that the probability and therefore also the risk of the motor vehicle wheel approaching other vehicle components can be lowered, particularly while driving over roadway boundaries that are elevated with respect to a roadway surface. This is advantageous in combination with a power steering device, which makes available a mechanical steering angle range that is limited by steering stops, for example while slowly maneuvering the motor vehicle in constricted areas, because additional steering rack travel can be released and a turning radius of the motor vehicle therefore can also be optimized in case a driver of the motor vehicle drives over a roadway boundary that is elevated with respect to a roadway surface, for example, while the tires are fully turned. This in turn makes it possible to minimize a required active back-steering maneuver by the power steering device, which could be perceived as irritating by the driver of the motor vehicle, or to at least carry out this back-steering maneuver slower.

According to the embodiments of FIG. 1, the step 3 of increasing the damping force includes an increase of the damping force such that a hard damping force characteristic is adjusted.

In addition, the method 1 according to the embodiments of FIG. 1 also includes a step 5 of back-steering a driver of the motor vehicle until the steering angle once again falls short of the steering stop, as well as a step 6, in which the damping force and the maximum achievable steering angle are reduced again as soon as the steering angle once again falls short of the steering stop. The damping force and the maximum achievable steering angle particularly are reset to the previous adjustments as soon as the steering angle once again falls short of the steering stop such that the regular control mode, which is optimally adapted to the motor vehicle and/or the driving situation, can be resumed as soon as an optimization of the turning radius is no longer required.

Figure 2:
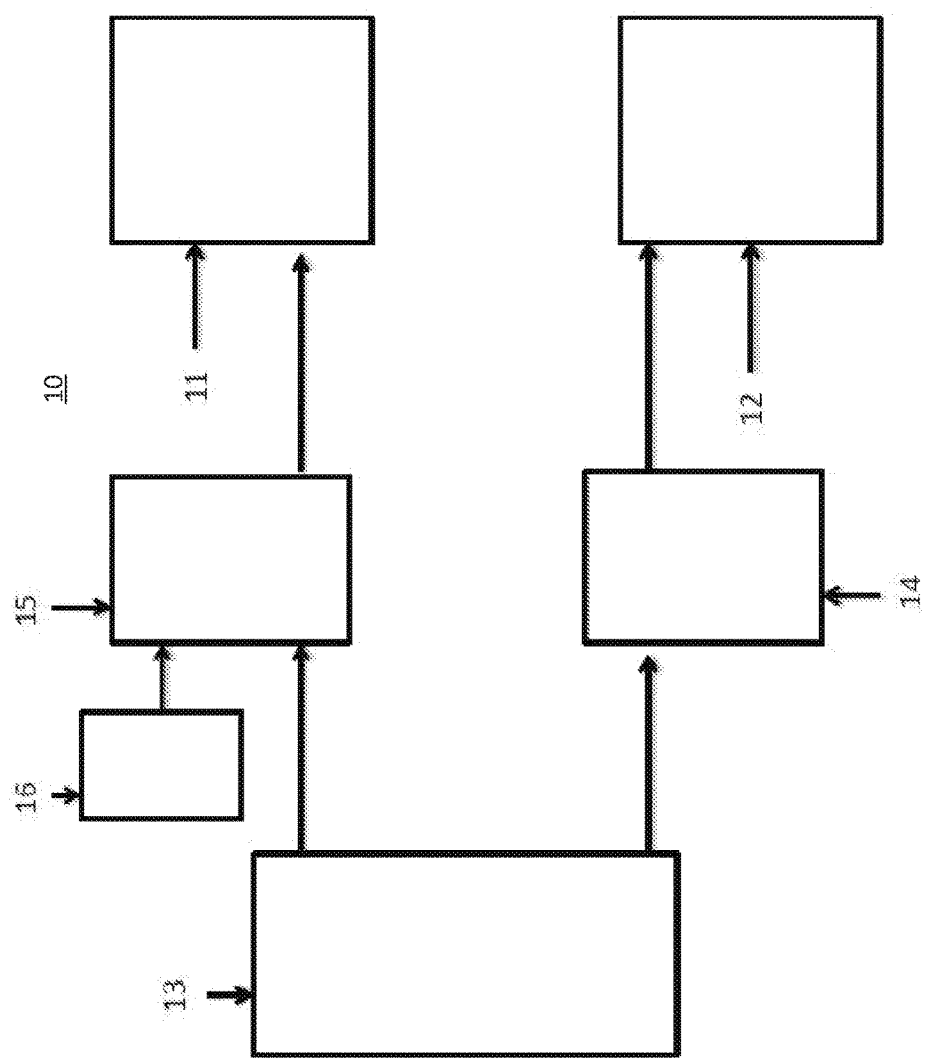
FIG. 2 shows a schematic block diagram of a control device for controlling a power steeling device and an adaptive damping system of a motor vehicle in accordance with embodiments of the present disclosure.

FIG. 2 shows a schematic block diagram of a control device 10 for controlling a power steering device 11 and an adaptive damping system 12 of a motor vehicle according to embodiments of the present disclosure. The power steering device 11 makes available a mechanical steering angle range that is limited by steering stops and the adaptive damping system 12 makes available a variable damping force. According to FIG. 2, the control device 10 features a sensor 13 configured to determine whether a steering stop is reached, a first control unit 14 that controls the damping system 12 and is configured to increase the damping force of the adaptive damping system 12 in case a steering stop is reached, as well as a second control unit 15 that controls the power steering device 11 and is designed for increasing the maximum achievable steering angle in case the steeling stop is reached.

According to the embodiments of FIG. 2, the first control unit 14 for controlling the damping system 12 is designed for increasing the damping force in such a way that a hard damping force characteristic is adjusted.

According to the embodiments of FIG. 2, the power steeling device 11 is furthermore designed for actively back-steering until the steering angle once again falls short of the steering stop and therefore designed for actively back-steering from the oversteering range, wherein this active back-steering maneuver can be carried out slower than in motor vehicles, in which a damping force of an active damping system is not increased simultaneously with an increase of the maximum achievable steering angle and it is therefore absolutely imperative to reduce a steering rack travel of the steering system in order to prevent a motor vehicle wheel from approaching the vehicle structure. This back-steering maneuver consequently is no longer perceived as annoying or irritating by a driver of the motor vehicle such that the comfort for the driver of the motor vehicle can be additionally optimized.

In these embodiments, the first control unit 14 is furthermore designed for reducing the damping force again as soon as the steering angle once again falls short of the steering stop. The second control unit 15 is furthermore designed for reducing the maximum achievable steering angle again as soon as the steering angle once again falls short of the steering stop.

According to FIG. 2, the control device 10 furthermore features a second sensor 16 configured to determine at least one piece of wheel-specific information affecting the maximum achievable steering angle. The second control unit 15 is designed for also varying the maximum achievable steering angle based on the at least one piece of wheel-specific information affecting the maximum achievable steering angle.

According to the embodiments of FIG. 2, the at least one piece of wheel-specific information affecting the maximum achievable steering angle consist of information on the width of a wheel of the motor vehicle, as well as information on an attachment part on the wheel that changes the width of the wheel.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling a power steering device and an adaptive suspension damping system of a motor vehicle comprising:
   establishing a mechanical steering angle range in the power steering device limited by steering stops;
   establishing a variable damping force in the adaptive suspension damping system; and
   increasing the variable damping force of the adaptive suspension damping system and a maximum achievable steering angle when a steering stop is reached.

2. The method according to claim 1, further comprising increasing the damping force such that a hard damping force characteristic is adjusted.

3. The method according to claim 1, further comprising reducing the damping force and the maximum achievable steering angle when the steering angle falls short of the steering stop.

4. The method according to claim 3, further comprising executing an active back-steering maneuver with the power steering device until the steering angle falls short of the steering stop.

5. The method according to claim 1, further comprising determining at least one piece of wheel-specific information affecting the maximum achievable steering angle, and a variation of the maximum achievable steering angle based on the at least one piece of wheel-specific information affecting the maximum achievable steering angle.

6. The method according to claim 5, wherein the at least one piece of wheel-specific information affecting the maximum achievable steering angle includes at least one of the width of a wheel of the motor vehicle or information on an attachment part on the wheel that changes the width of the wheel.

7. A non-transitory computer readable medium comprising a computer program that, when executed on a control unit in a motor vehicle, carries out the method according to claim 1.

8. A control device for controlling a power steering device and an adaptive suspension damping system of a motor vehicle comprising:

a sensor configured to determine whether a steering stop is reached;

a first control unit operable to control the adaptive suspension damping system and configured to increase a damping force of the adaptive suspension damping system when a steering stop is reached; and a second control unit operable to control the power steering device and configured to increase a maximum achievable steering angle when the steering stop is reached.

9. The control device according to claim 8, wherein the first control unit is configured to increase the damping force in such a way that a hard damping force characteristic is adjusted.

10. The control device according to claim 8, wherein the first control unit is configured to reduce the damping force again when the steering angle falls short of the steering stop, and wherein the second control unit is configured to reduce the maximum achievable steering angle again when the steering angle falls short of the steering stop.

11. The control device according to claim 10, wherein the power steering device is configured to actively back-steer until the steering angle falls short of the steering stop.

12. The control device according claim 8, further comprising a second sensor configured to determine at least one piece of wheel-specific information affecting the maximum achievable steering angle, and wherein the second control unit is configured to vary the maximum achievable steering angle based on the at least one piece of information affecting the maximum achievable steering angle.

13. The control device according to claim 12, wherein the at least one piece of wheel-specific information affecting the maximum achievable steering angle includes at least one of information on the width of a wheel of the motor vehicle or information on an attachment part on the wheel that changes the width of the wheel.

14. A motor vehicle comprising a power steering device, an adaptive suspension damping system and a control device according to claim 8.

15. A vehicle, comprising:

a power steering system having a first steering stop corresponding to a first steering angle and a second steering stop corresponding to a second steering angle greater than the first steering angle;

an adaptive suspension damping system; and a control device communicatively coupled to the power steering system and the adaptive suspension system, the control device comprising:

a sensor configured to determine a steering angle of the vehicle;

a first control unit operable to control a dampening force of the adaptive suspension damping system; and a second control unit operable to control a maximum achievable steering angle of the power steering device, wherein the first control unit and second control unit are configured to:

set, when an angle of the steering angle is less than the first steering angle, the dampening force of the adaptive suspension damping system to a first predetermined force and set the maximum achievable steering angle to the first steering stop;

set, when the angle of the steering angle is greater than or equal to the first steering angle and less than the second steering angle, the dampening force of the adaptive suspension damping system to a second predetermined force greater than the first predetermine force and set the maximum achievable steering angle to the second steering stop.

\* \* \* \* \*